United States Patent
Cordeiro (10) Patent No.: US 8,830,887 B2
(45) Date of Patent: Sep. 9, 2014

(54) SYSTEM AND METHOD FOR MULTI-RESOLUTION PACKET TRANSMISSION FOR ULTRA-LOW POWER WIRELESS NETWORKS

(75) Inventor: Carlos M. Cordeiro, Portland, OR (US)

(73) Assignee: Koninklijke Philips N.V., Eindhoven (NL)

( * ) Notice: Subject to any disclaimer, the term of this patent is extended or adjusted under 35 U.S.C. 154(b) by 428 days.

(21) Appl. No.: 12/746,564

(22) PCT Filed: Dec. 24, 2008

(86) PCT No.: PCT/IB2008/055536
§ 371 (c)(1),
(2), (4) Date: Jun. 7, 2010

(87) PCT Pub. No.: WO2009/083918
PCT Pub. Date: Jul. 9, 2009

(65) Prior Publication Data
US 2010/0265863 A1   Oct. 21, 2010

Related U.S. Application Data

(60) Provisional application No. 61/017,247, filed on Dec. 28, 2007.

(51) Int. Cl.
*G08C 17/00* (2006.01)
*H04W 52/02* (2009.01)
*H04B 1/7176* (2011.01)
*H04W 84/18* (2009.01)

(52) U.S. Cl.
CPC ............. *H04B 1/7176* (2013.01); *H04W 84/18* (2013.01); *H04W 52/0225* (2013.01)
USPC ............................ 370/311; 370/349; 370/389

(58) Field of Classification Search
USPC ................................ 370/311, 314, 349, 389
See application file for complete search history.

(56) References Cited

U.S. PATENT DOCUMENTS

| | | | |
|---|---|---|---|
| 7,948,939 B2 * | 5/2011 | Sugaya et al. | 370/329 |
| 2002/0169008 A1 | 11/2002 | Hiben | |
| 2006/0020433 A1 | 1/2006 | Taha | |
| 2007/0066329 A1 | 3/2007 | Laroia | |
| 2007/0101020 A1 * | 5/2007 | Lin et al. | 709/238 |
| 2008/0037540 A1 * | 2/2008 | Ngo et al. | 370/392 |
| 2008/0192726 A1 * | 8/2008 | Mahesh et al. | 370/349 |
| 2008/0304432 A1 * | 12/2008 | Lee et al. | 370/311 |
| 2009/0092039 A1 * | 4/2009 | Niu et al. | 370/208 |

FOREIGN PATENT DOCUMENTS

EP   1657852 A1   5/2006
WO   WO2005074171 A2   8/2005

* cited by examiner

*Primary Examiner* — Omer S Mian
(74) *Attorney, Agent, or Firm* — Larry Liberchuk (57) ABSTRACT

A system and method for multi-resolution packet (MRP) transmission for ultra-low power wireless networks is disclosed. In one embodiment, a method of transmitting a MRP for ultra-low power wireless networks and wherein each ultra-low power wireless network includes a transmitting unit and one or more communication units that communicate via wireless links, includes transmitting destination identifier data during a preamble period by the transmitting unit, not transmitting data during a midamble period that substantially follows the preamble period for processing the received destination identifier data to determine a destination identifier by the one or more communication units, and transmitting payload data during a payload period substantially following the midamble period for processing payload data received during the payload period based on the determined destination identifier during the midamble period.

22 Claims, 6 Drawing Sheets

SYSTEM AND METHOD FOR MULTI-RESOLUTION PACKET TRANSMISSION FOR ULTRA-LOW POWER WIRELESS NETWORKS

The present invention relates generally to packet transmission for wireless networks, and in particular, to a system and method for packet transmission for ultra-low power wireless networks.

Energy conservation is a key design criterion in wireless networks that require ultra-low power operation, such as sensor networks and body area networks. In these networks, protocols are generally designed to be extremely energy efficient. This is generally accomplished by duty-cycling a node's activity between sleep and active periods. However, only duty-cycling may not be enough to achieve energy efficiency.

When nodes are in active state, unintended packet receptions, generally referred to as overhearing, by a node can consume significant amount of energy and other resources. Unintended packet receptions can be detrimental to power consumption as the nodes can waste energy by overhearing packets (as each packet requires buffering, decoding, demodulating and so on) destined for other nodes.

Example embodiments are illustrated by way of example and not limitation in the figures of the accompanying drawings, in which like references indicate similar elements and in which.

Other features of the present embodiments will be apparent from the accompanying drawings and from the detailed description that follows.

A system and method for multi-resolution packet (MRP) transmission for ultra-low power wireless networks is disclosed. In the following description, for purposes of explanation, numerous specific details are set forth in order to provide a thorough understanding of the various embodiments. It will be evident, however, to one skilled in the art that the various embodiments may be practiced without these specific details.

Figure 1:
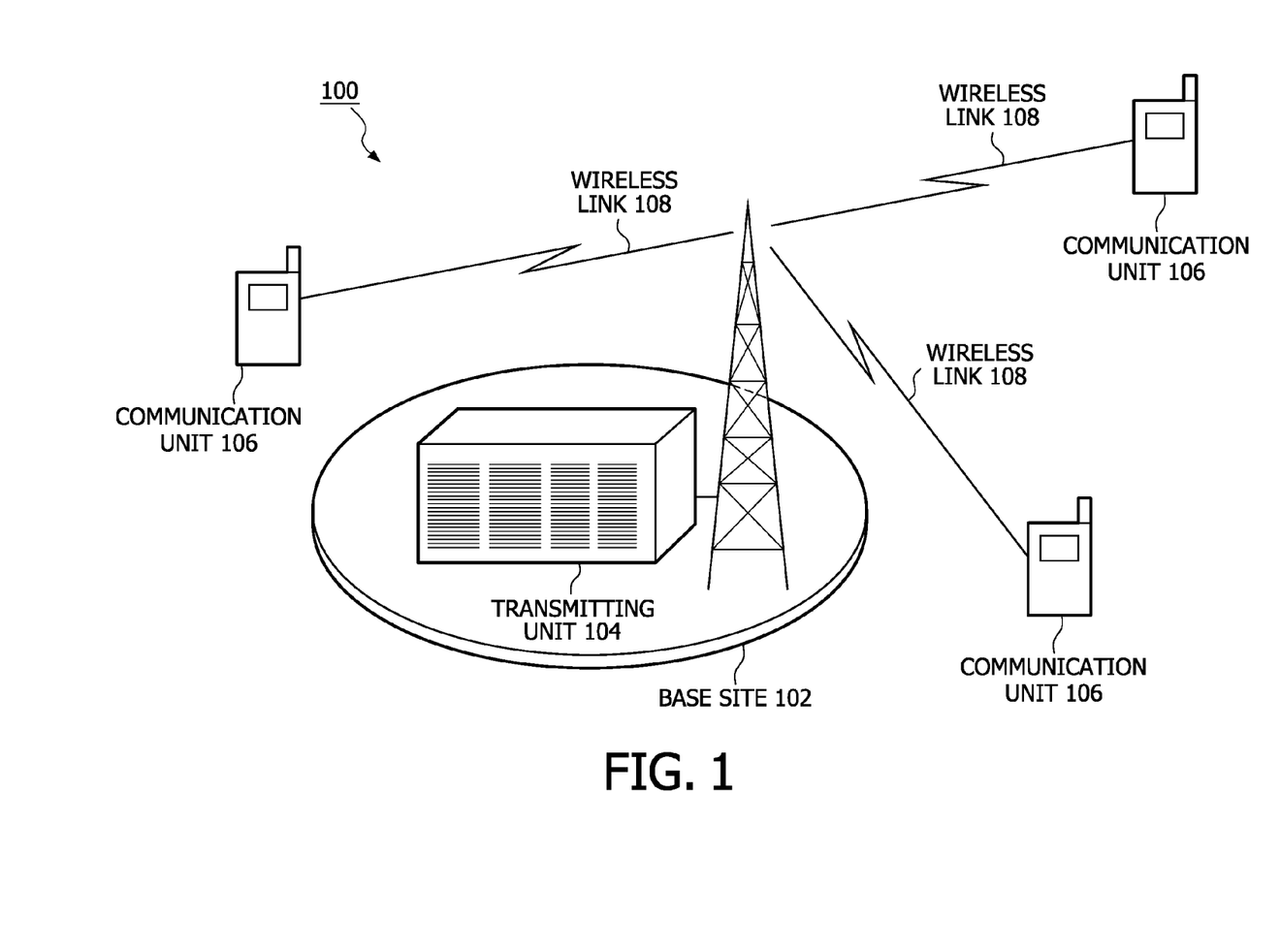
FIG. 1 illustrates an ultra-low power wireless network in the context of the invention.

FIG. 1 illustrates an ultra-low power wireless network 100 in the context of the invention. Particularly, FIG. 1 illustrates a base site 102 having a transmitting unit 104 and a plurality of communication units 106. For example, the ultra-low power wireless network 100 may be a wireless local area network (LAN)/personal area network (PAN)/Wide Area Network (WAN), a sensor network, a body area network, and the like. In some embodiments, the ultra-low power wireless network 100 supports centralized and distributed modes of media access control (MAC) protocols. The communication units 106 may include devices (e.g., sensor nodes of the sensor network and leads of the body area network) capable of receiving and processing packets from the transmitting unit 104 (e.g., through a radio).

The transmitting unit 104 communicates with the one or more communication units 106 within a coverage area of the base site 102 via wireless links 108. In this example, the transmitting unit 104 is responsible for transmission of a MRP (e.g., a single packet fragmented into one or more segments that are a part of a single transmission and whose transmissions are separated by time), via the wireless links 108, while the one or more communication units 106 are responsible for reception and processing of the MRPs destined for the one or more communication units 106. Further, the MRP is explained in greater detail in FIG. 4 and FIG. 5. In one embodiment, the wireless links 108 can be shared by the one or more communication units 106. FIG. 1, in particular, illustrates the ultra-low power wireless network 100 used for transmission of MRPs, helping in conservation of system resources through combating overhearing of packets, the details of which will be explained in the succeeding paragraphs.

The term "overhearing" refers to reception and processing of an unintended packet during an active mode of the one or more communication units 106. Further, the system resource conservation could be embodied in any number of ways including, for example, conservation of battery power when using sensor networks and body area networks on a mobile device, conserving processor usage and conserving when packets are transmitted across the ultra-low power wireless network 100 to one or more remote locations.

Figure 4:
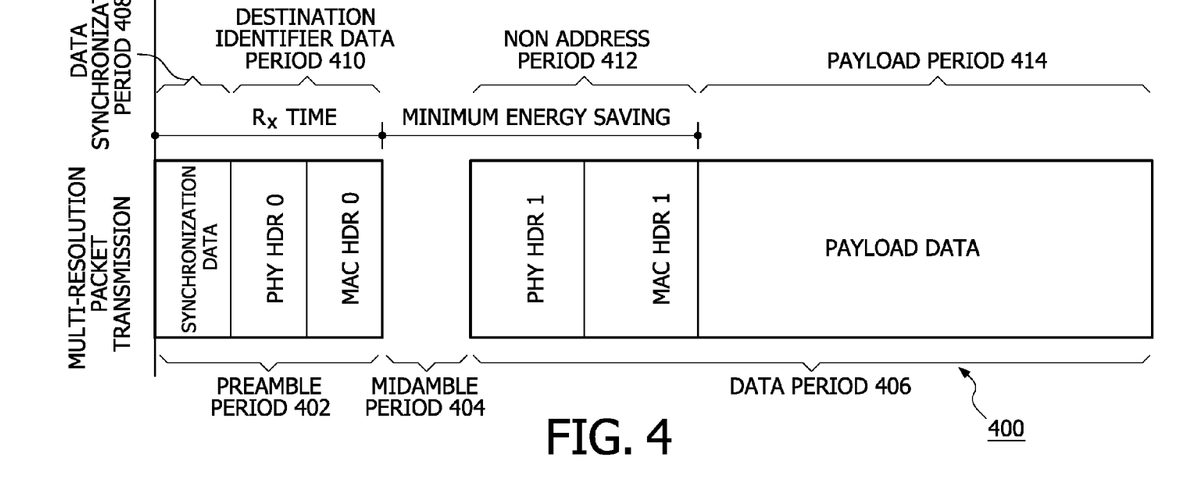
FIG. 4 illustrates a multi-resolution packet (MRP) framework, in accordance with an embodiment of the invention.

To illustrate, consider an MRP fragmented into three segments namely, a preamble period (e.g., the preamble period 402 of FIG. 4), a midamble period (e.g., the midamble period 404 of FIG. 4) and a data period (e.g., the data period 406 of FIG. 4). It can be noted that the preamble period 402, the midamble period 404 and the data period 406 are part of a single transmission whose transmissions are separated by time. One skilled in the art can understand that the MRP for the ultra-low power wireless network 100 can be fragmented into any number of segments and is not restricted to the fragmentation of the periods described above.

In operation, the transmitting unit 104 of the base site 102 sends data associated with each of the periods sequentially via the wireless links 108, but inserts an idle gap (e.g., referred as midamble period hereinafter) between the preamble period 402 and the data period 406. This allows the one or more communication units 106 enough time to process the destination information (e.g., associated with the preamble period 402) and determine whether the MRP is destined for the communication unit 106. After the midamble period 404, the transmitting unit 104 continues transmission of the MRP by transmitting payload data associated with the data period 406. In some embodiments, the one or more communication units 106 continues to receive and process payload data associated with the data period 406 or goes back to sleep mode based on the determination during the midamble period 404.

The processing of the preamble period 402 (e.g., during the midamble period 404) eliminates acts of buffering, decoding and demodulation of the MRPs which are not intended for a particular communication unit 106. This helps the one or more communication units 106 to conserve the system resources by going into sleep mode (e.g., at least for remaining duration of ongoing MRP transmission), without receiving (i.e., buffering, decoding, demodulating) rest of the MRP segments not destined for that communication unit 106. In other words, this technique enables conservation of the system resources by combating overhearing of MRPs.

Figure 2:
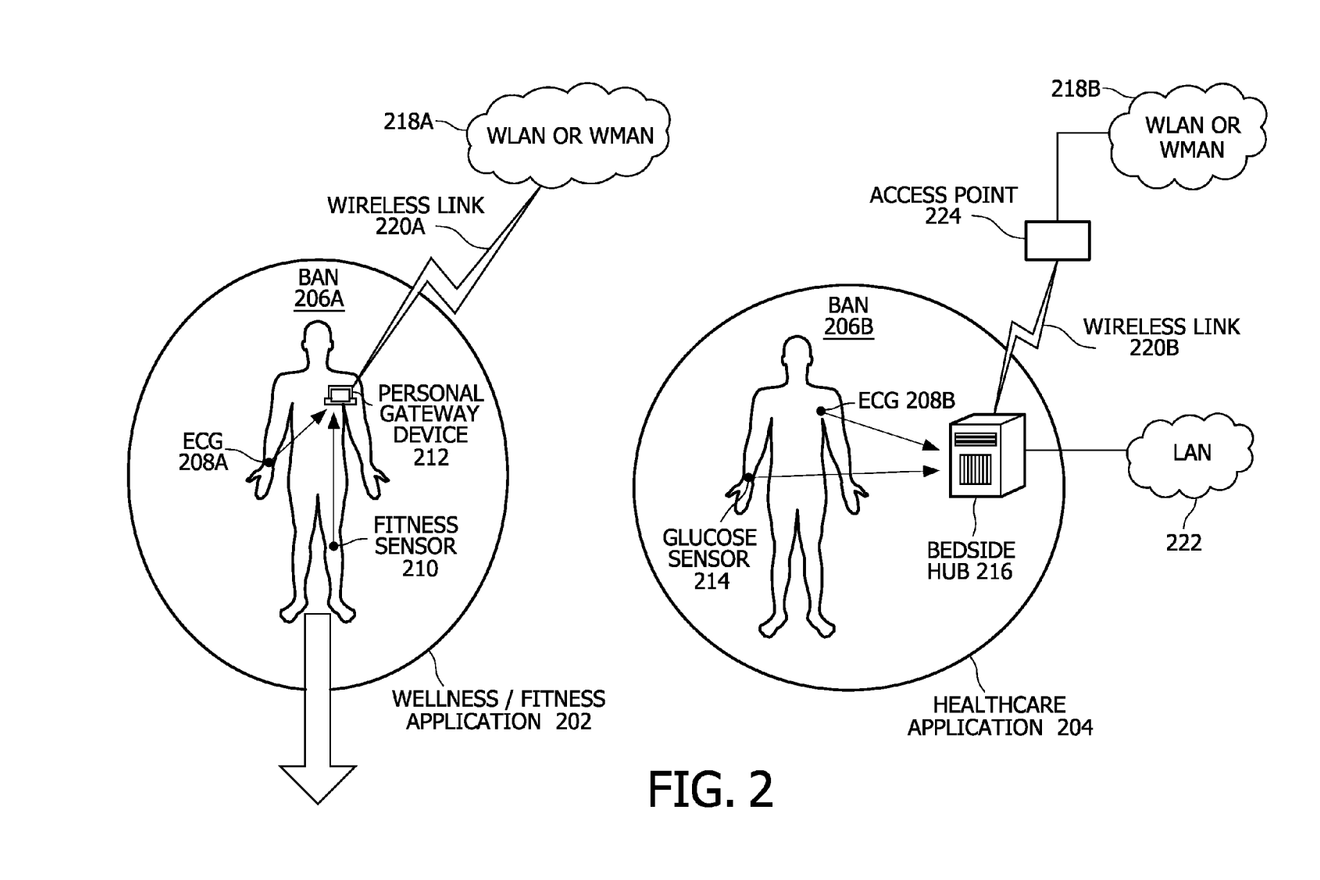
FIG. 2 is a diagram of an exemplary operation environment in the context of the invention.

FIG. 2 is a diagram of one exemplary operational environment in the context of the invention. It can be seen that the above technique described with reference to FIG. 1 is being used in Wellness/Fitness application 202 and/or Healthcare application 204. It can be envisioned that the above technique can be extended to any short-range wireless networks.

FIG. 2 shows BANs 206A-B including body area sensors (devices), such as an electro-cardiogram (ECG) 208A-B, a fitness sensor 210 and/or a glucose sensor 214 communicating with a portable/personal device (e.g. gateway) 212 or fixed hub (e.g. patient monitor or bedside hub 216), that processes information locally and/or forward the information to a service processing center through any external network connection, which could be a Wireless Local Area Network (WLAN), cellular network, wired network and/or a Wireless Metropolitan Area Network (WMAN) 218.

In operation, the BAN devices share a wireless channel to exchange data. In one example, the body sensors (i.e. ECG 208A and fitness sensor 210) send monitoring data to the personal gateway device 212 carried by the user. The personal gateway device 212 may process the information locally, display the information and/or forward the data to a service processing center through an external connection (e.g. Wireless Local Area Network (WLAN), Wireless Metropolitan Area Network (WMAN) or cellular network) by using WLAN or WMAN link 220 as illustrated in the BAN 206A. In another example, the body sensors (i.e. ECG 208B and glucose sensors 214) send monitoring data to the bedside hub 216, which can also process and display information locally or forward it to a server in another network through WLAN 218B (e.g., using access point 224) or LAN 222 as illustrated in the BAN 206B of FIG. 2.

It can be noted that the MRP transmission technique (e.g., described in FIG. 6) can be implemented in the BANs 206A-B to combat overhearing and thereby conserving energy resources in the BANs 206A-B that require ultra-low power operation.

Figure 3:
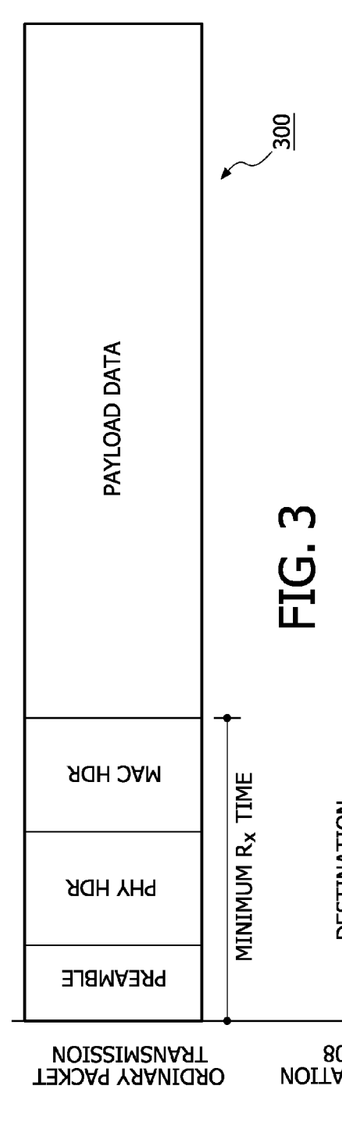
FIG. 3 illustrates a typical reference packet framework in the context of the invention.

FIG. 3 illustrates a reference packet framework 300 in the context of the invention. Particularly, FIG. 3 illustrates a typical method of packet transmission (e.g., an ordinary packet transmission) in which a single packet is transmitted as a single entity from a transmitter (e.g., the transmitting unit 104 of FIG. 1) to a receiver (e.g., the communication unit 106 of FIG. 1), via the wireless links 108. In a typical packet transmission system over a wireless network, during active modes of the transmitting unit 104 and the one or more communication units 106, the transmitting unit 104 transmits the single resolution packet to the one or more communication units 106. Further, the one or more communication units 106 receive the packet 300 and process the packet 300. For example, processing of the packet 300 includes steps such as buffering payload data of the packet 300, decoding the payload data and demodulating the decoded payload data.

In addition, during the active mode, the one or more communication units 106 may receive and process the packet 300 even if it is not intended for that particular communication unit 106. In other words, an unintended packet from the transmitting unit 104 is received and processed as a single entity without verifying address and destination information (e.g., included in PHY and MAC headers of the packet 300) of the packet 300 prior to processing the entire unintended packet 300. Hence, the reception and processing of the unintended packets by the one or more communication units 106 can consume significant amount of the system resources. For example, the one or more communication units 106 may waste a significant amount of energy by buffering, decoding and demodulating the packet 300 destined for another communication unit 106.

Therefore, it becomes important that the packet 300 is processed upon determining a destination identifier associated with a packet for conserving the system resources. In other words, the packet 300 should be processed only if the determined destination address is associated with the communication unit 106, else the communication unit 106 can go to sleep mode. In addition, generally, it becomes increasingly important to process only the intended packets as the size of the packet increases. The present invention implements transmission of MRP which is fragmented into one or more segments that are part of a single transmission destined for the communication unit 106 thereby conserving system resources in the ultra-low power wireless network 100. Further, the details of MRP transmission are explained in FIG. 4 and FIG. 5 respectively.

FIG. 4 illustrates an MRP framework 400, in accordance with an embodiment of the invention. Particularly, FIG. 4 illustrates an MRP transmission technique for the ultra-low power wireless network 100 of FIG. 1. The MRP is a single packet fragmented into one or more segments (i.e., multiple levels of resolution) that are a part of a single transmission.

In the example embodiment illustrated in FIG. 4, the MRP 400 for the ultra-low power wireless network 100 is fragmented into three segments (e.g., two levels of resolution) namely a preamble period 402, a midamble period 404 and a data period 406. The preamble period 402 includes a data synchronization period 408 and a destination identifier data period 410. The data synchronization period 408 includes synchronization data for synchronizing the one or more communication units 106 and the destination identifier data period 410 includes a first portion of PHY and MAC headers and a total transmission duration time.

Further, the first portion of PHY and MAC headers (PHY HDR 0, MAC HDR 0) includes destination identifier data including substantially address and destination information. In some embodiments, the address and the destination information is used to determine whether the data period 406 is to be received and processed. The midamble period 404 substantially follows the preamble period 402 for processing the destination identifier data to determine a destination identifier by the one or more communication units 106.

The data period 406 substantially follows the midamble period 404 to be received by the one or more communication units 106 based on the determination of the destination identifier. The data period 406 includes a non address period 412 and a payload period 414. The non address period 412 includes a second portion of the PHY and MAC headers (PHY HDR 1, MAC HDR 1) and the payload period 414 includes payload data.

In one embodiment, if the determined destination identifier is associated with the one or more communication units 106, the payload data associated with the payload period 414 is received during the data period 406 and the payload data is processed (i.e., buffered, decoded and demodulated). It can be noted that the payload data of the MRP can be segmented into multiple sub payloads such that, one or more associated sub payloads are processed during the payload period 414 (e.g., as illustrated in FIG. 4). In another embodiment, if the determined destination is not associated with the one or more communication units 106, receiving of the remaining segment (i.e., the data period 406) of the MRP is stopped, thereby conserving the system resources in the ultra-low power wireless network 100.

In an alternate embodiment, the MRP for the ultra-low power wireless network 100 that supports the centralized and/or distributed modes (e.g., that rely on beacon transmissions (e.g., ECMA 368 UWB MAC standard, etc.)), of MAC protocols includes a first preamble period, a second preamble period, and a data period. In these embodiments, the first preamble period includes a data synchronization period 408 and a data destination identifier period 410. The synchronization period 408 includes synchronizing data and the destination identifier data period 410 includes destination identifier data. In some embodiments, the destination identifier data includes a first portion of PHY and MAC headers and a total transmission duration time. In these embodiments, the first portion of PHY and MAC headers includes substantially address and destination information needed to determine whether the data period needs to be received and processed.

The second preamble period substantially follows the first preamble period for substantially simultaneously processing the destination identifier data to determine a destination identifier, and the synchronization data to synchronize the one or more communication units 106 and the transmitting unit 104 by the one or more communication units 106. Further, the data period substantially follows the second preamble period to be received by the one or more communication units 106 based on the determined destination identifier.

The data period of the MRP includes a second portion of the PHY and MAC headers and a payload period 414 including payload data. In some embodiments, the payload data received during the data period is processed (i.e., buffered, decoded and demodulated) by one or more communication units 106. One skilled in the art will understand that the MRP 400 for the ultra-low power wireless network 100 that supports the distributed mode of MAC protocols retains a distributed nature of the MAC protocols while making them energy efficient.

In another embodiment, wireless networks which include beaconing devices and non-beaconing devices where beaconing devices transmit periodic beacon packets and resource constrained non-beaconing devices that do not transmit beacon packets. In these embodiments, the non-beaconing devices, upon receiving the first preamble period of the large multi-resolution beacon packet, can substantially immediately go back to sleep mode. Hence, only beacon capable devices (e.g., not as much ultra-low power devices as other nodes) would receive entire beacon packets while the more ultra-low power non-beaconing devices would not receive such packets, thereby leading to further energy conservation.

Further, referring to FIGS. 3 and 4, it can be noted that, it is desirable to minimize overhearing for conserving the system resources, when the size of the packet is large or increasing. This can be achieved by transmitting a single packet fragmented into different segments (i.e., MRP 400) and processing payload data of the MRP 400 if the MRP 400 is intended for the one or more communication units 106 as described. In case, if the MRPs are not intended for the one or more communication units 106, the one or more communication units 106 can go to sleep mode (e.g., for a duration required to buffer, decode and demodulate the unintended MRPs), thereby conserving the system resources and minimizing overhearing.

Figure 5:
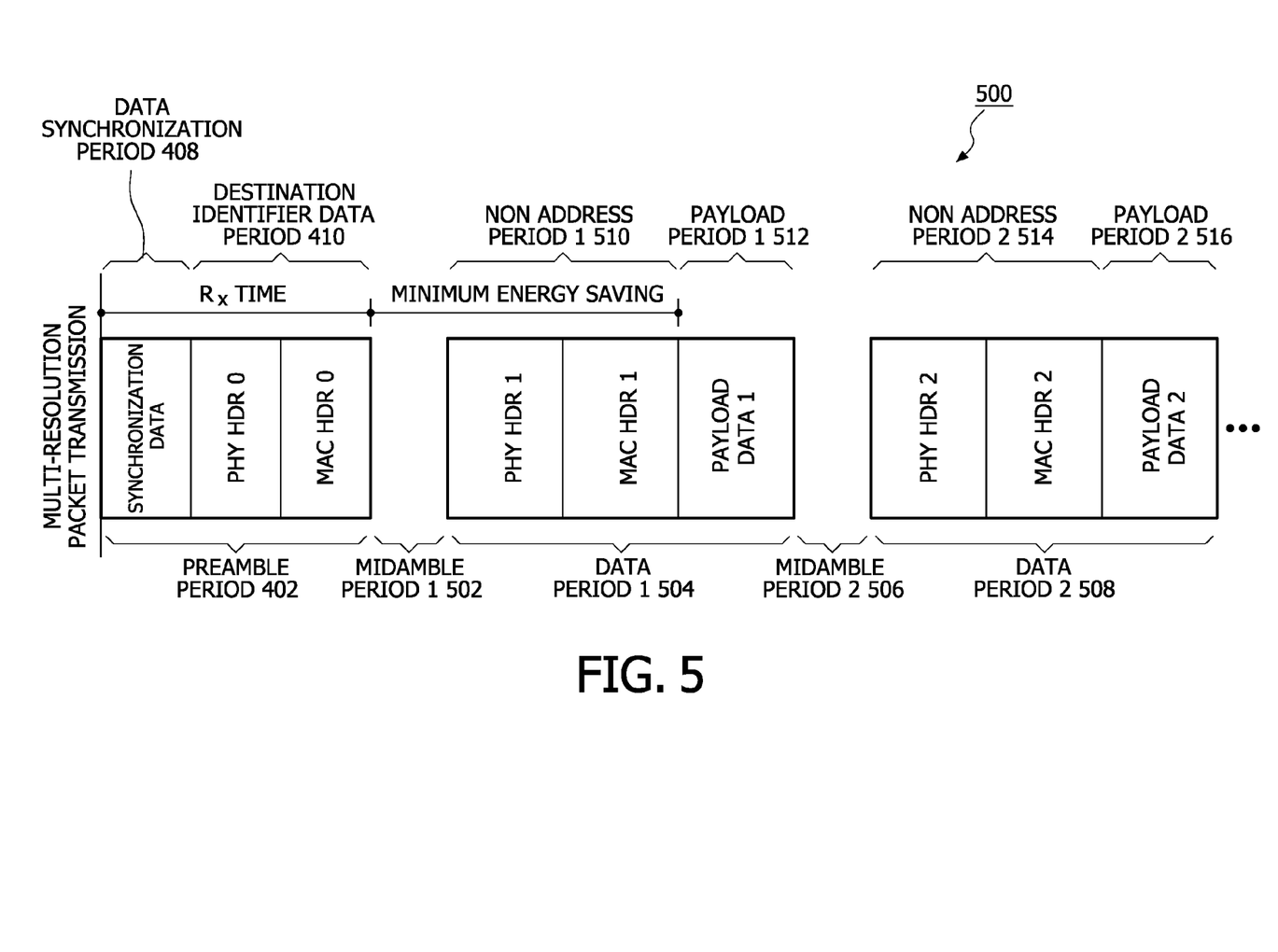
FIG. 5 illustrates another MRP framework, in accordance with an embodiment of the invention.

FIG. 5 illustrates a MRP framework 500, in accordance with an embodiment of the invention. Particularly, FIG. 5 illustrates the MRP framework 500 having a two midamble periods, viz, the first midamble period 1 502 between the preamble period 402 and a first data period 1 504 and the second midamble period 2 506 between the first data period 1 504 and a second data period 2 508. The second midamble period 2 506 is inserted (e.g., by the transmission unit 104) to fragment a single data period into multiple segments (e.g., the first data period 1 504 and second data period 2 508). From FIG. 5, it can be envisioned that above technique can be implemented with multiple midamble periods in an MRP. In some embodiments, the MRP 500 may have one or more data periods (e.g., the first data period 1 504 and the second data period 2 508) and associated one or more midamble periods (e.g., the first midamble period 1 502 and the second midamble period 2 506) between the one or more data periods, thereby MRP 500 can have multiple resolutions. It can be seen that, in these embodiments, the communication units 106 can be in sleep mode for several data periods (segments) and then wake up upon receipt of relevant segment and thus help conserving the energy. It can be envisioned that one skilled in the art can implement the MRP framework in various such embodiments to conserve energy.

In this example, the one or more communication units 106 receive destination identifier data during the preamble period 402 and determine (e.g., using the destination identifier data) a destination identifier during the first midamble period 1 502. Further, the one or more communication units 106 receive and process first payload data segment associated with the first data period 1 504 including a first non address period 1 510 and a first payload period 1 512. The first non address period 2 514 includes a second portion of the PHY and MAC headers and the first payload period 1 512 includes sub payload data. In some embodiments, each communication unit 106 processes the destination identifier data associated with the preamble period 402 and the first payload data associated with the first data period 1 504 to determine whether the MRP 500 is destined for that communication unit 106 and further to determine whether sub payload data associated with the second data period 2 508 needs to be processed. In other words, the one or more communication units 106 determine during the second midamble period 2 506 which of the multiple sub payloads needs to be processed. For example, the second data period 2 508 includes a second non address period 2 514 and a second payload period 2 516. The second non address period 2 514 includes a third portion of PHY and MAC headers and the second payload period 2 516 includes sub payload data.

In accordance with one or more embodiments described above, the MRP 500 for ultra-low power wireless networks including a transmitting unit 104 and one or more communication units 106 connected via wireless links may include a preamble period 402 including destination identifier data, multiple midamble periods (e.g., the midamble period 1 502 and the second midamble period 2 506) substantially following the preamble period 402 for processing the destination identifier data to determine a destination identifier by the one or more communication units 106, and multiple data periods (e.g., the data period 1 504 and the data period 2 508), each of the multiple data periods substantially following each of the associated midamble periods to be received by the one or more communication units 106 based on the determination of the destination identifier.

Further, the preamble period 402 includes a data synchronization period 408 and a destination identifier data period 410. In some embodiments, the data synchronization period 408 includes synchronization data and the destination identifier data period 410 includes a first portion of PHY and MAC headers and a total transmission duration time. In these embodiments, the first portion of the PHY and MAC headers includes substantially address and destination information needed to determine whether the data period needs to be received and processed. The data period includes a non address period (e.g., the non address period 1 510 and the non address period 2 514) including a second portion of the PHY and MAC headers and a payload period (e.g., the payload period 1 514 and the payload period 2 516) including payload data.

The above transmission technique can be implemented when a payload data includes multiple sub payloads destined for the one or more communication units and each associated sub payload needs to be processed by the communication units 106, without processing the non associated sub payloads. Further, the transmission of the MRP 500 with multiple midamble periods in between multiple data periods helps in achieving significant improved energy efficiency.

Figure 6:
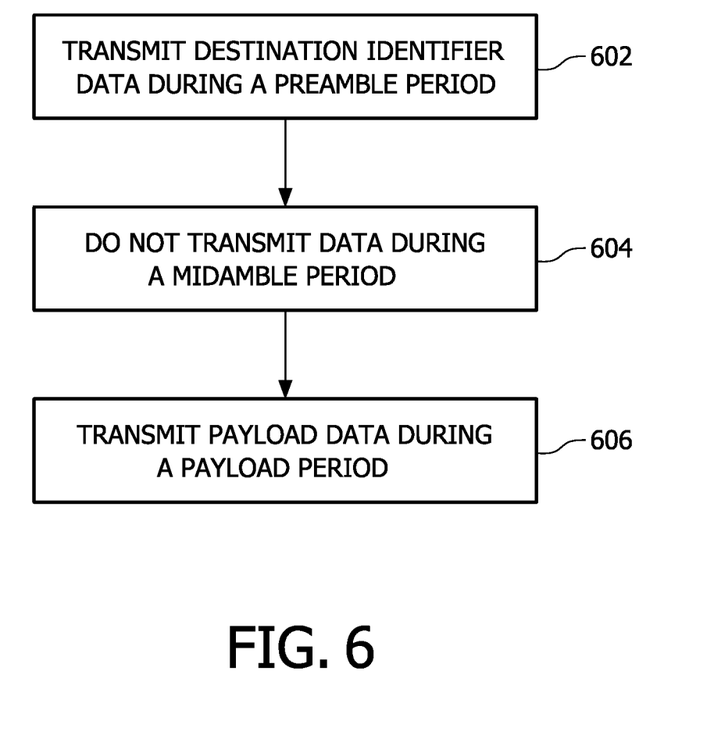
FIG. 6 is a flowchart for illustrating first exemplary method for transmitting the MRP, shown in FIG. 4, in accordance with an embodiment of the invention.

FIG. 6 is a flowchart for illustrating first exemplary method for transmitting the MRP 400, shown in FIG. 4, in accordance with an embodiment of the invention. In operation 602, destination identifier data is transmitted during a preamble period 402 by the transmitting unit 104 to the one or more communication units 106. In some embodiments, the preamble period 402 includes a data synchronization period 408 and a destination identifier data period 410. Further, the data synchronization period 408 includes synchronization data and the destination identifier data period 410 includes destination identifier data (i.e., including a first portion of PHY and MAC headers and a total transmission duration time).

In operation 604, data substantially following the preamble period 402 is not transmitted such that the destination identifier data is processed during a midamble period 404 by the one or more communication units 106 to determine a destination identifier. In some embodiments, the destination identifier data includes substantially address and destination information needed to determine whether the data period 406 needs to be received and processed (e.g., by the destined communication unit(s) 106). In these embodiments, the data period 406 includes a non address period 412 including the second portion of the PHY and MAC headers and a payload period 414 including the payload data.

In operation 606, payload data substantially following the midamble period 404 is transmitted and the payload data is processed during the payload period 414 based on the determined destination identifier during the midamble period 404. In these embodiments, the payload data is received during the payload period 414 and is processed by the one or more communication units 106 based on the determined destination identifier data. For example, the processing of the payload data includes buffering, decoding, and demodulating.

Figure 7:
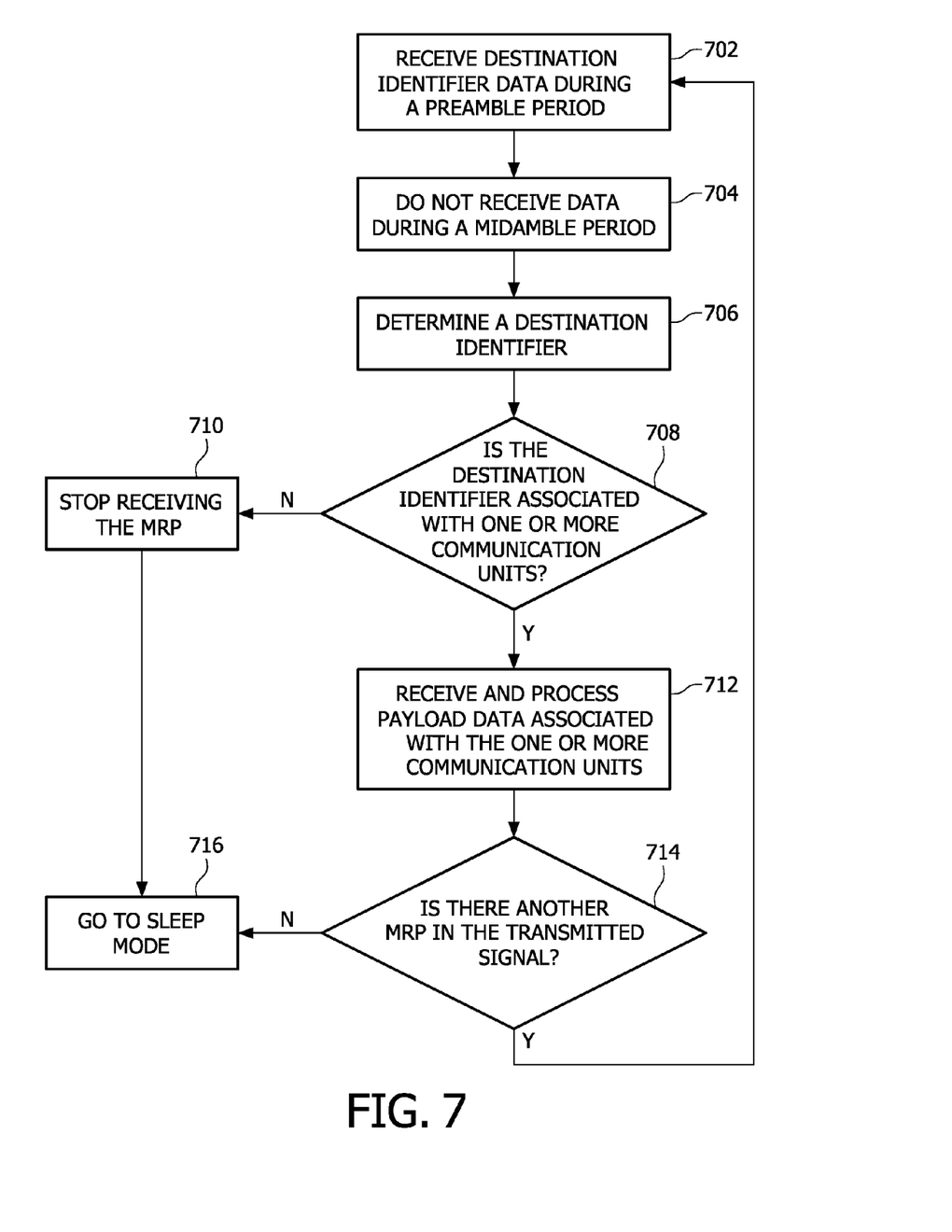
FIG. 7 is a flowchart for illustrating first exemplary method for receiving the transmitted MRP, shown in FIGS. 4-6, in accordance with an embodiment of the invention.

FIG. 7 is a flowchart for illustrating a first exemplary method for receiving the transmitted MRP 400, shown in FIG. 4 and FIG. 6, in accordance with an embodiment of the invention. In operation 702, destination identifier data is received during the preamble period 402 by the one or more communication units 106 from the transmitting unit 104. In some embodiments, the preamble period 402 includes a data synchronization period 408 and a destination identifier data period 410. Further, the data synchronization period 408 includes synchronization data and the destination identifier data period 410 includes destination identifier data (i.e., a first portion of the PHY and MAC headers and a total transmission duration time).

In operation 704, data substantially following the preamble period 402 is not received during the midamble period by the one or more communication units 106. In operation 706, a destination identifier is determined using the destination identifier data received during the preamble period 402 by the one or more communication units 106. For example, the destination identifier data includes address and destination information.

In operation 708, it is checked whether the destination identifier is associated with the one or more communication units 106. If the determined destination identifier is associated with the one or more communication units 106, then in operation 712, payload data is received during the payload period 414 which substantially follows the midamble period 404 and, the payload data associated with the one or more communication units 106 is processed based on the determined destination identifier.

In some embodiments, the one or more communication units 106 receive the payload data during the payload period 414 and process the payload data. In these embodiments, processing of the payload data includes buffering the payload data, decoding the payload data and demodulating the decoded payload data. For example, the payload data may include multiple sub payloads. In these embodiments, one or more associated sub payloads are processed during the payload period 414.

Receiving of the payload data associated with the MRP is stopped in operation 710 if the determined destination identifier is not associated with the one or more communication units 106. In some embodiments, the one or more communication units 106 go to sleep mode upon stopping receiving of the payload data (i.e., when the determined destination identifier is not associated with the one or more communication units). In other words, operation 716 is performed after operation 710.

In operation 714, it is determined whether another MRP 400 in the transmitted signal is to be received from the transmitting unit 104 for processing payload data. If it is determined that another MRP is to be received by the one more communication units 106, then the process 700 goes to operation 702 and repeats the operations 702-714, else the process 700 performs operation 716. In operation 716, the one or more communication units 106 go to sleep mode if no other MRP is to be received for processing the payload data.

It can be noted that the operations 702-714 are performed during the active mode of the transmitting unit 104 and/or the one or more communication units 106. Further, it can be noted that the process 700 enables receiving and processing (e.g., buffering, decoding and demodulating) of intended MRP 400 (e.g., determined based on the destination identifier data by the one or more communication units 106) and the one or more communication units 106 go to sleep mode if reception of the MRP is unintended, i.e., if the determined destination identifier is not associated with one or more communication units 106, the payload data associated with the payload period 414 will not be received (i.e., buffered, decoded and demodulated).

In some embodiments, the payload of a packet is fragmented and is transmitted according to the above-described MRP scheme. In these embodiments, each of the payload fragments may not have PHY and MAC headers. Also in these embodiments, the PHY and MAC headers can be optional in fragments substantially following the first fragment. In some embodiments, after processing each current fragment the receiver makes a decision as to process or not process any of the subsequent fragments.

For example, in a temperature sensing monitoring sensor network the first fragment may list highest temperature among all of the body area sensors/devices and subsequent fragments may include temperature of individual sensors. In these embodiments, the receiver processes the first fragment to verify if the highest temperature is below a threshold. If the highest temperature is below the threshold, then device may decide not to receive subsequent fragments and can go back to sleep. Otherwise, the device can continue processing subsequent fragments to find which device reports a temperature higher than the threshold.

Those skilled in the art will realize that overhearing (e.g., unintended MRP transmissions and receptions) of packets is minimized and the system resources are conserved in the ultra-low power wireless networks if the intended MRPs only are processed during the active mode of the one or more communication units 106.

The above-described technique combats overhearing and thereby conserving of energy resources in wireless networks that require ultra-low power operation, such as sensor networks and body area networks through using MRP in ultra-low power wireless networks. The above framework can be used for centralized and distributed modes of MAC protocols.

It will be appreciated that the various embodiments discussed herein may not be the same embodiment, and may be grouped into various other embodiments not explicitly disclosed herein. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

In interpreting the appended claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function; and
e) each of the disclosed elements may be comprised of hardware portions (e.g., discrete electronic circuitry), software portions (e.g., computer programming), or any combination thereof.

What is claimed is:

1. A transmitting unit configured to transmit a multi-resolution packet (MRP) for an ultra-low power wireless network, the ultra-low power wireless network including the transmitting unit and one or more communication units connected via wireless links, the transmitting unit comprising:
a transmitter; and a processor configured to form the MRP including:
a preamble period including destination identifier data;
a plurality of midamble periods following the preamble period for processing the destination identifier data to determine a destination identifier by the one or more communication units, the plurality of midamble periods including no data; and
a plurality of data periods, each of the plurality of data periods following a corresponding one of the plurality of midamble periods to be received by the one or more communication units based on the determination of the destination identifier, each of the plurality of data periods including a payload period including payload data and a non-address period including a first portion of the PHY and MAC headers.

2. The transmitting unit of claim 1, wherein the preamble period comprises a data synchronization period and a destination identifier data period.

3. The transmitting unit of claim 2, wherein the data synchronization period includes synchronization data and the destination identifier data period includes a second portion of PHY and MAC headers and a total transmission duration time.

4. The transmitting unit of claim 3, wherein the second portion of the PHY and MAC headers includes address and destination information needed to determine whether the data period needs to be received and processed.

5. The transmitting unit of claim 1, wherein the one or more communication units receive the payload data during the plurality of data periods and processes the payload data and wherein the processes include acts selected from the group consisting of buffering, decoding, and demodulating.

6. A transmitting unit configured to transmit a multi-resolution packet (MRP) for an ultra-low power wireless network, the ultra-low power wireless network including the transmitting unit and one or more communication units that communicate via wireless links, the wireless network supporting both centralized and distributed modes of MAC protocols, the transmitting unit comprising:
a transmitter; and a processor configured to form the MRP including:
a first preamble period including a data synchronization period and a destination identifier data period, wherein the data synchronization period includes synchronizing data for synchronizing the one or more communication units and the destination identifier data period includes destination identifier data;
a plurality of second preamble periods following the first preamble period for simultaneously processing the destination identifier data to determine a destination identifier and to synchronize the one or more communication units with the transmitting unit, by the one or more communication units, the plurality of second preamble periods including no data; and
a plurality of data periods, each of the plurality of data periods following a corresponding one of the plurality of second preamble periods to be received by the one or more communication units based on the determined destination identifier, each of the plurality of data periods including a payload period including payload data and a non address period including a first portion of the PHY and MAC headers.

7. The transmitting unit of claim 6, wherein the destination identifier data comprises a second portion of PHY and MAC headers and a total transmission duration time.

8. The transmitting unit of claim 7, wherein the second portion of the PHY and MAC headers includes address and destination information needed to determine whether the data period needs to be received and processed.

9. The transmitting unit of claim 6, wherein the one or more communication units receive the payload data during the plurality of data periods and processes the payload data and wherein the processes include acts selected from the group consisting of buffering, decoding, and demodulating.

10. A method of transmitting a MRP for ultra-low power wireless networks and wherein each ultra-low power wireless network includes a transmitting unit and one or more communication units that communicate via wireless links, comprising:

transmitting destination identifier data and synchronization data during a preamble period by the transmitting unit;

not transmitting data following the preamble period for processing the destination identifier data during multiple midamble periods to determine a destination identifier by the one or more communication units; and transmitting payload data in multiple data periods, each of the multiple data periods following a corresponding one of the multiple midamble periods to be received by the one or more communication units based on the determined destination identifier during the midamble period, each of the multiple data periods including a payload period including payload data and a non address period including a first portion of PHY and MAC headers.

11. The method of claim 10, wherein the preamble period comprises a data synchronization period and a destination identifier data period.

12. The method of claim 11, wherein the data synchronization period includes synchronization data and the destination identifier data period includes a second portion of PHY and MAC headers and a total transmission duration time.

13. The method of claim 12, wherein the second portion of the PHY and MAC headers includes the address and destination information needed to determine whether the multiple data periods need to be received and processed.

14. The method of claim 10, further comprising:

receiving the payload data during the multiple data periods and processing the payload data based on the determined destination identifier data by the one or more communication units and wherein the processing includes acts selected from the group consisting of buffering, decoding, and demodulating.

15. A method of receiving a MRP for ultra-low power wireless networks from a transmitting unit by one or more communication units and wherein the MRP includes a preamble period, multiple midamble periods following the preamble period and multiple data periods, wherein each of the multiple data periods follows a corresponding one of the multiple midamble periods, comprising:

receiving destination identifier data and synchronization data during the preamble period by the one or more communication units;

not receiving data during the multiple midamble periods following the preamble period for determining a destination identifier using the destination identifier data received during the preamble period by the one or more communication units;

receiving the payload data during at least one of the data periods following the midamble period for processing payload data based on the determined destination identifier, each of the data periods including a payload period including payload data and a non address period including a first portion of PHY and MAC headers.

16. The method of claim 15, wherein receiving the payload data further comprises:

if the determined destination identifier is associated with the one or more communication units, then processing the payload data received during the at least one of the data periods; and if the determined destination identifier is not associated with the one or more communication units, then stop receiving the MRP.

17. The method of claim 16, wherein processing the received payload data comprises:

buffering the payload data;

decoding the payload data; and demodulating the decoded payload data.

18. The method of claim 15, wherein the payload data comprises multiple sub payloads and, based on the determined destination identifier processing one or more associated sub payloads during the payload period.

19. A transmitting unit configured to transmit a multi-resolution packet (MRP) for an ultra-low power wireless network, the ultra-low power wireless network including the transmitting unit and one or more communication units connected via wireless links, the transmitting unit comprising:

a transmitter; and a processor configured to form the MRP including:

a preamble period including destination identifier data and a data synchronization period including synchronization data;

multiple midamble periods following the preamble period for processing the destination identifier data to determine a destination identifier by the one or more communication units, the multiple midamble periods including no data; and multiple data periods, wherein each of the multiple data periods following each of the associated midamble periods to be received by the one or more communication units based on the determination of the destination identifier, each of the multiple data periods including a payload period including payload data and a non address period including a first portion of PHY and MAC headers.

20. The transmitting unit of claim 19, wherein the preamble period includes a destination identifier data period.

21. The transmitting unit of claim 20, wherein the destination identifier data period includes a second portion of PHY and MAC headers and a total transmission duration time.

22. The transmitting unit of claim 21, wherein the second portion of the PHY and MAC headers includes address and destination information needed to determine whether the data period needs to be received and processed.

* * * * *